Patented Jan. 27, 1931

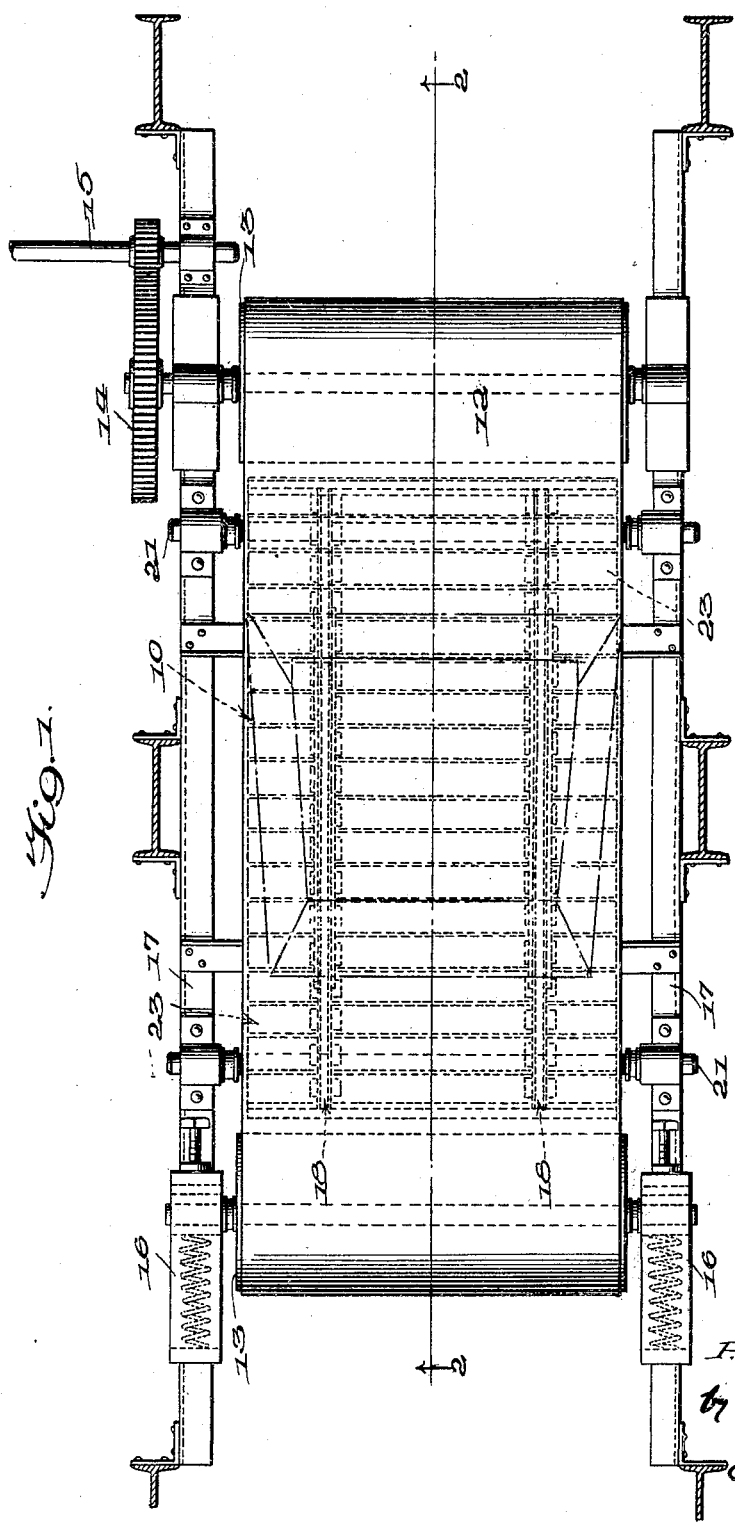

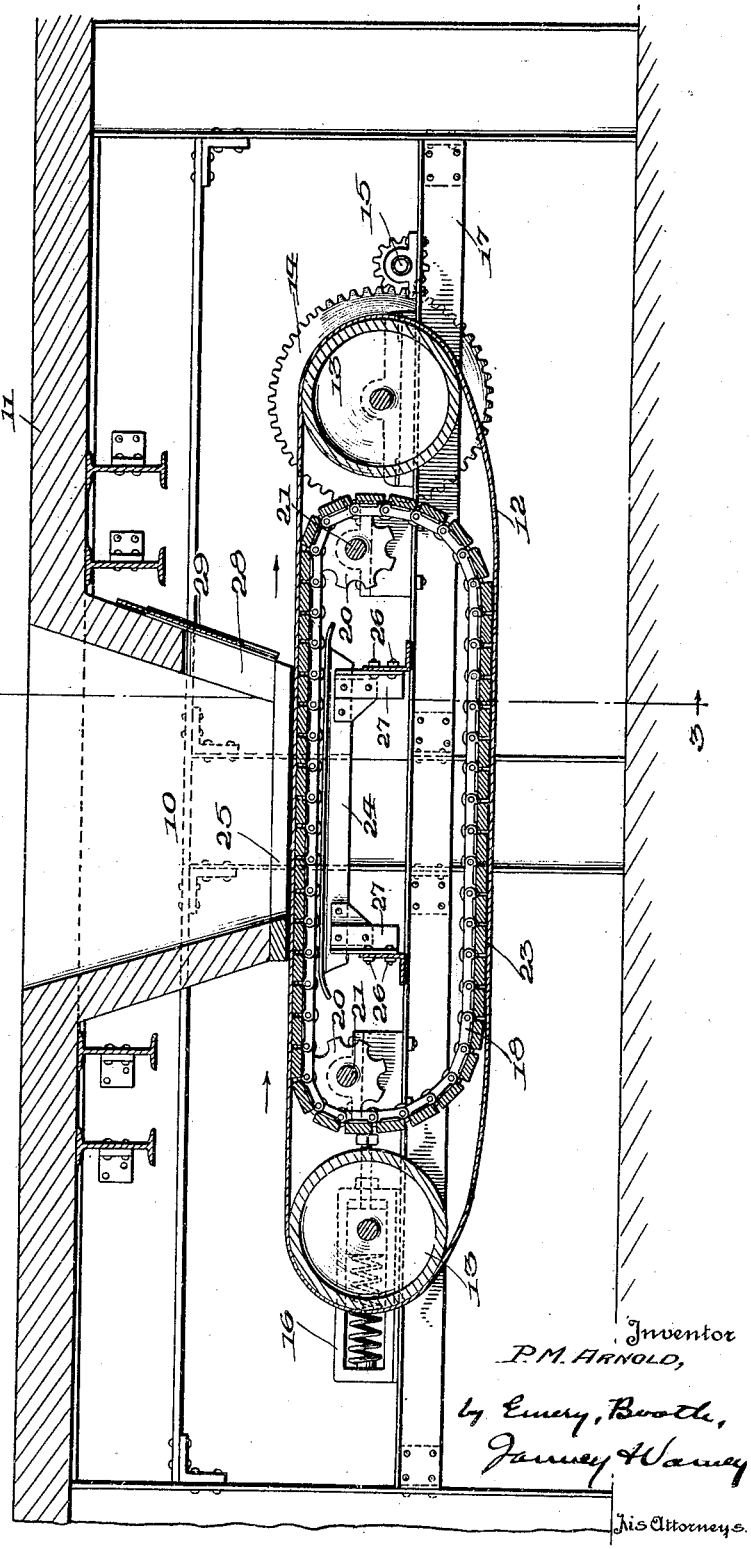

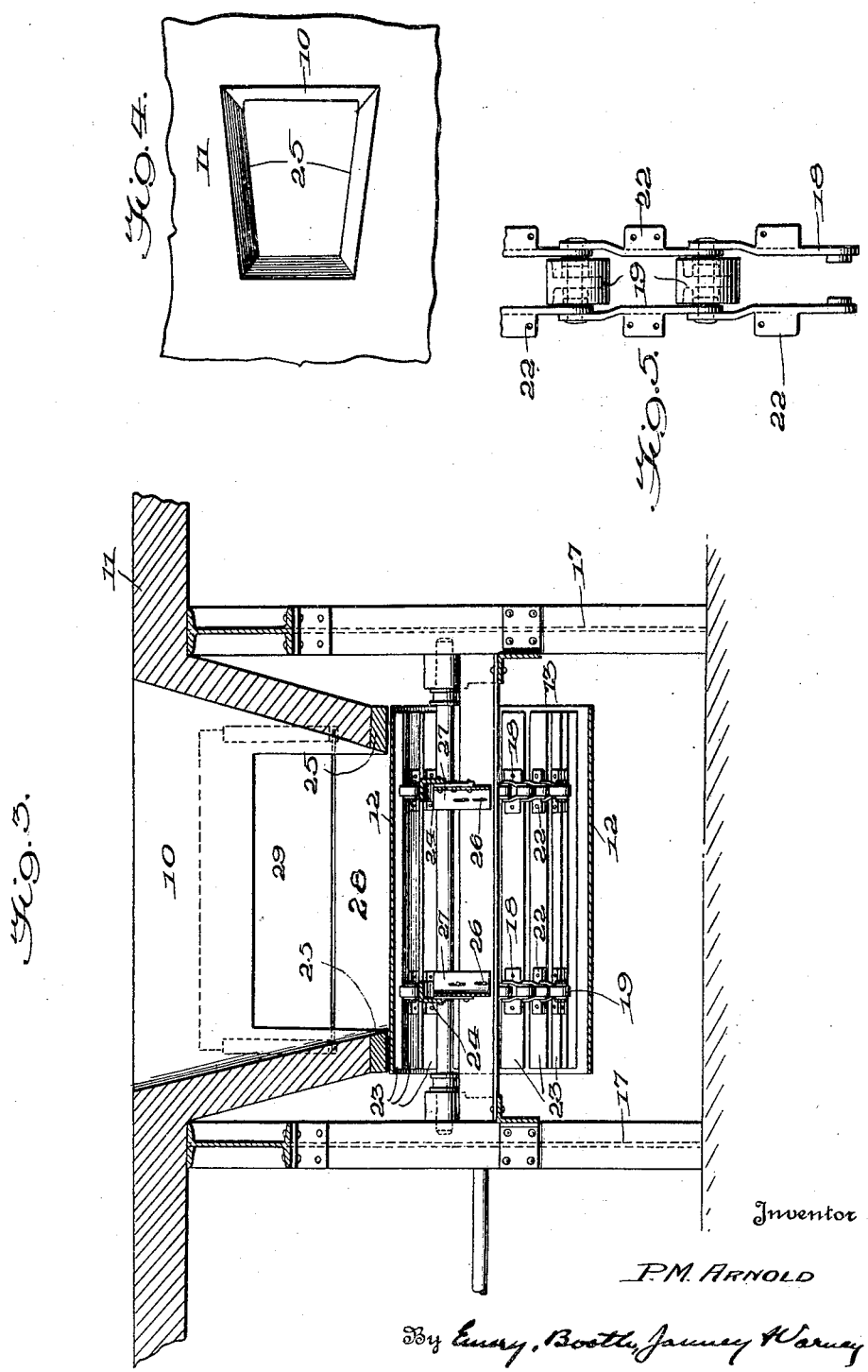

1,790,568

UNITED STATES PATENT OFFICE

PERRIE M. ARNOLD, OF WILMINGTON, DELAWARE

HOPPER FEED MECHANISM

Application filed February 4, 1928. Serial No. 251,876.

The invention relates particularly to feeding granular and powdered substances, crushed or ground minerals, grain, flour and other loose material, commonly handled in bulk, and aims to provide for feeding such material at a uniform rate irrespective of variations and changes in its condition, such as moisture content, degree of fineness, and shape and character of surface of the particles.

A further object is to provide against wear of the operating parts, so as to prolong the life of the feed belt and reduce the power required to drive it.

Further objects and advantages of the invention will appear in connection with the following description of the illustrative embodiment shown in the accompanying drawings, wherein Fig. 1 is a plan view of the feed belt and its supporting means, the outline of the hopper bottom opening being shown in broken lines;

Fig. 2 is a longitudinal section through the hopper and feed mechanism, taken on the line 2—2 of Fig. 1, looking in the direction of the arrows;

Fig. 3 is a transverse section of the same on the line 3—3 in Fig. 2, looking in the direction of the arrows;

Fig. 4 is a plan view of the hopper, drawn to a smaller scale; and

Fig. 5 is a plan view of a portion of the roller chain for supporting the feed belt, drawn to a larger scale than Figs. 1, 2 and 3.

Referring to the drawings, the hopper 10 shown therein has slanting walls and a bottom opening, and may be located in the floor 11 of a bin or other storage space, or at the delivery end of a conveyor or vehicle dump. The open bottom of the hopper is closed by a wide belt 12, such as a conveyor belt, running over drums 13, and driven in the direction of the arrows in Fig. 2 by means of suitable gearing 14 from a motor or other source of power on the shaft 15. A take up 16 is provided for adjusting the tension of the belt to insure that it runs without excessive slip. The bearings for the drums and driving gearing are mounted in side frames 17, supported in any convenient manner, as from the posts that carry the bin or hopper.

The upper stretch of the belt is supported between the drums to run flat close below the bottom edge of the hopper by means of a traveling platform comprising two sprocket chains 18 provided with rollers 19 and running over sprocket wheels 20 on two parallel shafts 21 mounted in suitable journals on the side frames 17. The chain links have ears 22 to which cross slats 23 are bolted, forming the platform for supporting the belt 12. The chain rollers 19 run on tracks 24 supported by the side frames beneath the bottom of the hopper 25. The tracks are so placed as to support the rollers and platform at the proper elevation to maintain the belt flat beneath the hopper and with just enough space to give proper clearance. The height of the tracks may be adjusted by loosening the bolts 26 (see Figs. 2 and 3) which pass through elongated slots in the brackets 27 that carry the tracks.

One end wall of the hopper is provided with an opening 28 and a gate 29 for adjusting the amount of opening. This opening is toward the direction of travel of the belt 12.

The opening in the bottom of the hopper preferably is slightly wider at the discharge opening end than at the opposite end, as shown in Fig. 4. Thereby any material that may penetrate between the lower edge of the hopper and the belt is dragged out by the belt as it travels toward the discharge end and does not wear the belt and bottom of the hopper.

In the operation of the device, the gate 29 is adjusted to regulate the depth of material on the belt, and the motor is operated at the speed necessary to feed the amount of material desired, which is discharged from the end of the belt over the drum at the driving end into the mill, machine, vat or other place of use, or to a conveyor to be transported to the place of use.

The supporting platform is dragged along by the belt, and prevents the latter from sagging at any point under the weight of the material. The return stretch of the platform may rest upon the belt, increasing the driving friction between the two, or the sprockets 20 may be driven by power means if desired.

By this arrangement the belt may be adjusted to run equally close beneath the hopper at all points so as to prevent material from working out at the sides, thereby doing away with the usual skirt boards that cause wear upon the belt. Also material is prevented from being compacted between the belt and the lower or bottom edge of the hopper in sags in the belt, and causing wear upon the under side of the hopper and both sides of the belt due to excessive pressure and friction at each of the supporting rolls.

By the use of the device not only may the feed be controlled with precision under varying conditions, but it will remain constant throughout considerable periods of time, irrespective of the amount of material in the hopper.

Having described a preferred embodiment of the invention, what I claim is as follows:

1. A hopper feed mechanism comprising a moving flexible belt beneath the hopper bottom opening, and means for maintaining the belt flat against the under side of the lower edge of the hopper, comprising a traveling platform moving with the belt and upon which it rests.

2. A hopper feed mechanism comprising a moving flexible belt beneath the hopper bottom opening, and means for maintaining the belt flat against the under side of the lower edge of the hopper, comprising a traveling platform moving with the belt and upon which it rests, and an adjustable trackway for supporting said platform.

3. A hopper feed mechanism comprising a moving flexible belt beneath the hopper bottom opening, and means for supporting the belt flat and at a uniform distance below the edge of the hopper, including a roller track, an endless roller chain running on said track, said chain being guided over sprockets at the ends of the track, and contact members carried by said chain for engaging the belt.

4. A hopper feed mechanism comprising a moving flexible belt beneath the hopper bottom opening, and means for supporting the belt flat and at a uniform distance below the edge of the hopper, including a pair of trackways, endless roller chains guided upon said trackways by means of sprocket wheels at the ends thereof, and contact members secured to said chains and bridging the space between said trackways.

5. In a device of the character described, a hopper 10 having a bottom opening 25, an endless flexible feed belt 12 movably arranged below said opening, a traveling endless platform carried on roller chains 18 for supporting said belt and maintaining it flat, and trackways 24 for supporting said chains beneath said hopper.

In testimony whereof, I have signed my name to this specification.

PERRIE M. ARNOLD.